(12) United States Patent
Dugas

(10) Patent No.: US 10,899,217 B2
(45) Date of Patent: Jan. 26, 2021

(54) SUPPLEMENTAL REGENERATIVE BRAKING SYSTEM

(71) Applicant: Patrick J. Dugas, Winter Haven, FL (US)

(72) Inventor: Patrick J. Dugas, Winter Haven, FL (US)

( * ) Notice: Subject to any disclaimer, the term of this patent is extended or adjusted under 35 U.S.C. 154(b) by 28 days.

(21) Appl. No.: 16/027,299

(22) Filed: Jul. 4, 2018

(65) Prior Publication Data

US 2019/0255933 A1     Aug. 22, 2019

(51) Int. Cl.

| | |
|---|---|
| *B60K 6/10* | (2006.01) |
| *F16F 15/315* | (2006.01) |
| *H02K 7/02* | (2006.01) |
| *A62C 3/16* | (2006.01) |
| *A62C 3/07* | (2006.01) |
| *H01M 10/42* | (2006.01) |
| *F16F 15/31* | (2006.01) |
| *B60L 7/10* | (2006.01) |
| *B62D 37/06* | (2006.01) |
| *B60L 53/00* | (2019.01) |

(52) U.S. Cl.
CPC ............... *B60K 6/105* (2013.01); *A62C 3/07* (2013.01); *A62C 3/16* (2013.01); *B60L 7/10* (2013.01); *B60L 53/00* (2019.02); *B62D 37/06* (2013.01); *F16F 15/31* (2013.01); *F16F 15/315* (2013.01); *H01M 10/42* (2013.01); *H02K 7/025* (2013.01); *B60L 2270/00* (2013.01); *F16F 2230/0023* (2013.01); *H01M 2200/10* (2013.01)

(58) Field of Classification Search
CPC ............ B60K 6/30; B60K 6/105; B60L 50/30
USPC .......................................................... 180/165
See application file for complete search history.

(56) References Cited

U.S. PATENT DOCUMENTS

| | | | | |
|---|---|---|---|---|
| 4,200,003 A | * | 4/1980 | Miller .................... | F16F 15/167 188/267.2 |
| 4,335,627 A | * | 6/1982 | Maxwell ................. | F16D 33/08 180/165 |
| 4,615,096 A | * | 10/1986 | Foster .................... | F16H 7/1236 192/12 A |
| 5,007,303 A | * | 4/1991 | Okuzumi ................ | F16F 15/16 188/267 |
| 5,086,664 A | * | 2/1992 | Wagner .................... | F16H 33/02 475/111 |
| 5,197,352 A | * | 3/1993 | Haikawa ................. | F02B 75/06 123/192.2 |
| 5,490,436 A | * | 2/1996 | Coyne .................... | F16F 15/366 464/180 |
| 6,758,295 B2 | * | 7/2004 | Fleming ................... | B60K 6/10 180/165 |

(Continued)

*Primary Examiner* — Jeffrey J Restifo

(74) *Attorney, Agent, or Firm* — Cygnet IP Law, P.A.; Stephen W. Aycock, II

(57) ABSTRACT

Some implementations can include a supplemental regenerative braking system comprising a power take-off section to receive mechanical energy, and an electric clutch to engage the power take-off section and transfer mechanical energy from the power take-off section to an output of the electric clutch. The system can also include a roller stop assembly coupled to the output of the electric clutch and constructed to transfer mechanical energy from the output of the electric clutch, and a generator coupled to the roller stop assembly. The system can further include a flywheel coupled to the generator.

4 Claims, 14 Drawing Sheets

OPEN VALVE POSITION

OPEN VALVE POSITION

(56) References Cited

U.S. PATENT DOCUMENTS

| | | | | |
|---|---|---|---|---|
| 6,883,399 B2* | 4/2005 | Burstall | ............... | B60K 6/105 |
| | | | | 74/573.1 |
| 6,962,223 B2* | 11/2005 | Berbari | ............... | B60K 6/105 |
| | | | | 180/165 |
| 7,044,022 B2* | 5/2006 | Kim | ............... | F16F 15/31 |
| | | | | 74/571.11 |
| 7,387,182 B2* | 6/2008 | Fleming | ............... | B60K 6/48 |
| | | | | 180/165 |
| 7,448,298 B2* | 11/2008 | Watanabe | ............... | F16F 15/173 |
| | | | | 74/572.2 |
| 7,654,355 B1* | 2/2010 | Williams | ............... | B60K 5/08 |
| | | | | 180/165 |
| 8,056,914 B2* | 11/2011 | Kalil | ............... | B60B 19/06 |
| | | | | 280/217 |
| 8,074,534 B2* | 12/2011 | Savant | ............... | F16F 15/30 |
| | | | | 184/6.14 |
| 8,172,022 B2* | 5/2012 | Schneidewind | ............... | B60K 6/105 |
| | | | | 180/165 |
| 8,373,368 B2* | 2/2013 | Achiriloaie | ............... | F16F 15/31 |
| | | | | 318/161 |
| 8,590,420 B2* | 11/2013 | Van de Ven | ............... | F16F 15/16 |
| | | | | 74/573.1 |
| 8,752,452 B2* | 6/2014 | Hsu | ............... | A63B 21/225 |
| | | | | 74/572.2 |
| 9,162,560 B2* | 10/2015 | Jacobson | ............... | B60W 10/24 |
| 9,457,671 B2* | 10/2016 | Manganaro | ............... | B60L 58/10 |
| 9,718,343 B2* | 8/2017 | Atkins | ............... | B60K 6/105 |
| 9,837,874 B2* | 12/2017 | Jian | ............... | H02K 7/025 |
| 10,122,240 B2* | 11/2018 | Tsai | ............... | H02K 7/1807 |
| 10,500,975 B1* | 12/2019 | Healy | ............... | B60L 7/18 |
| 2009/0320640 A1* | 12/2009 | Elliott | ............... | F16F 15/31 |
| | | | | 74/572.21 |

* cited by examiner

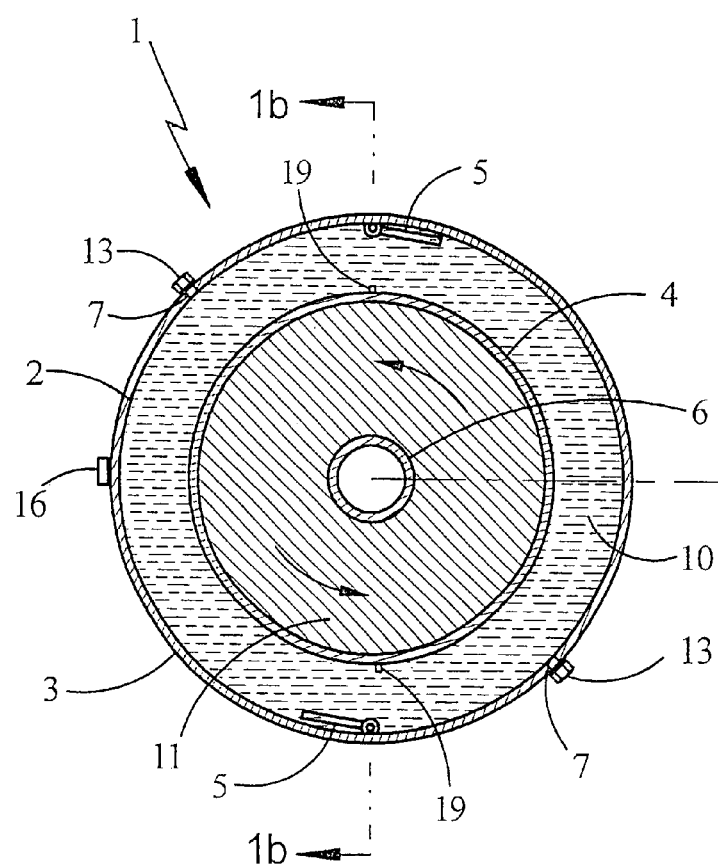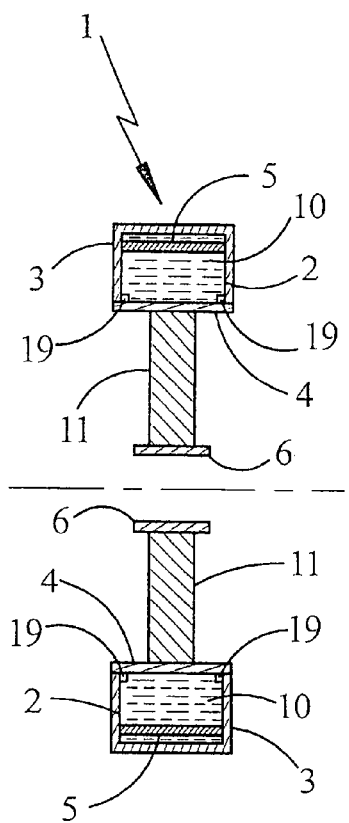
OPEN VALVE POSITION
OPEN VALVE POSITION
FIG.6A
FIG.6B

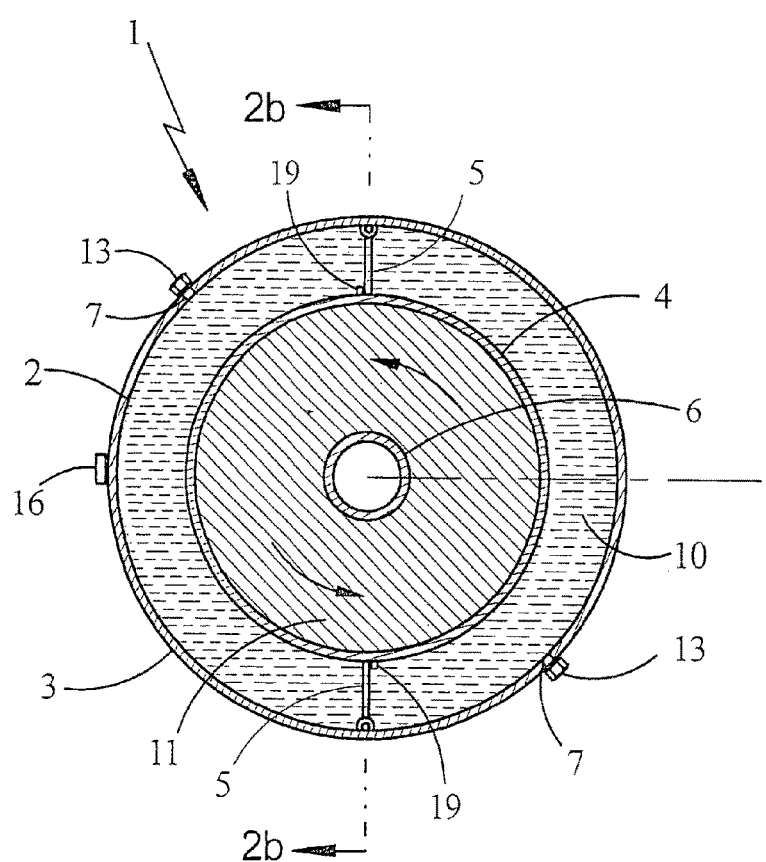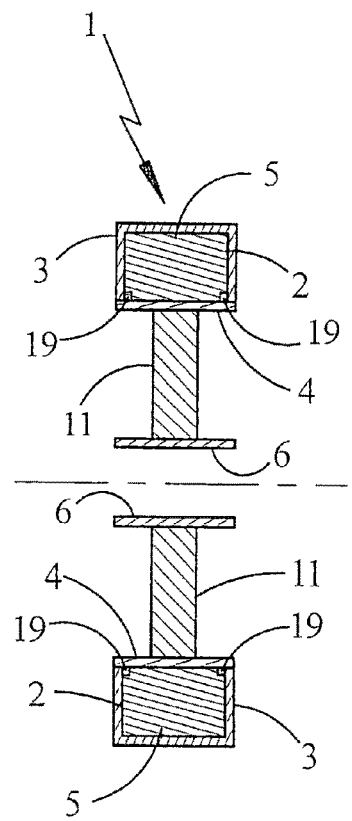
CLOSED VALVE POSITION
CLOSED VALVE POSITION
FIG.7A
FIG.7B

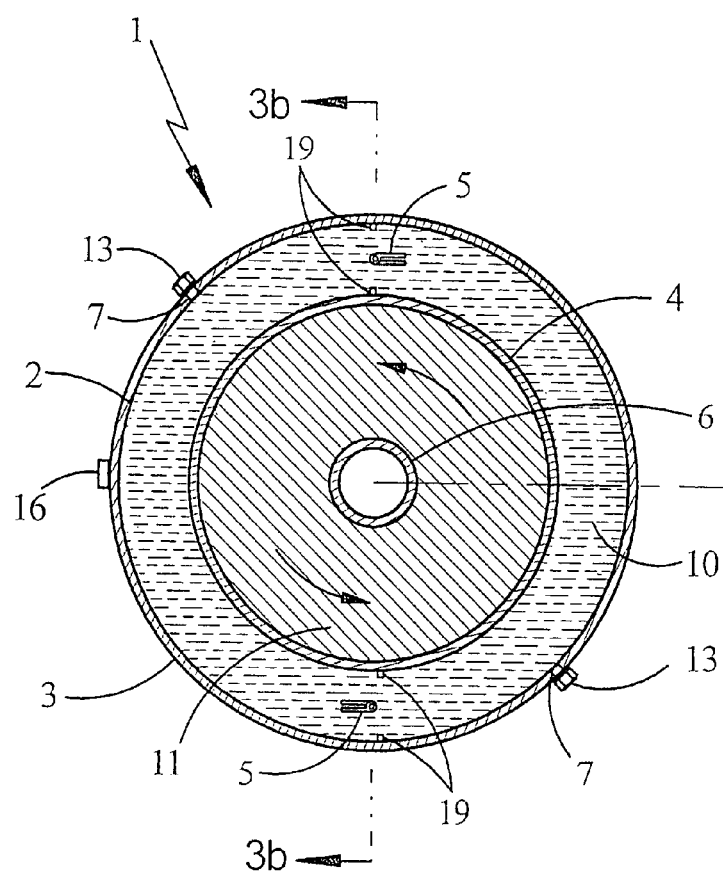 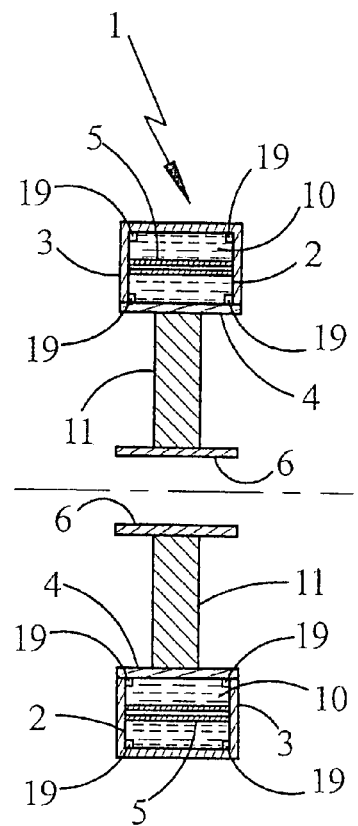
OPEN VALVE POSITION
OPEN VALVE POSITION
FIG.8A
FIG.8B

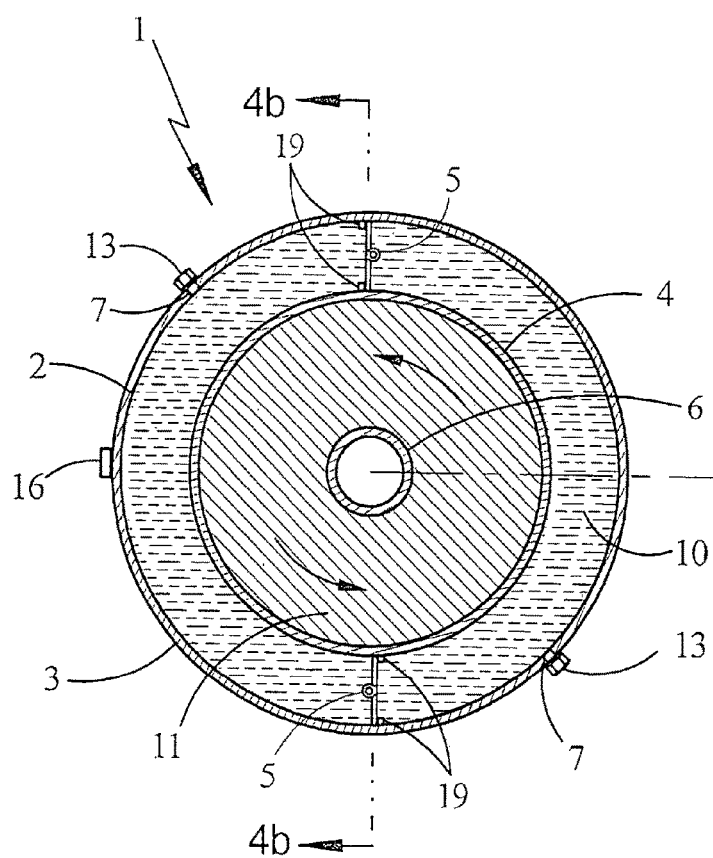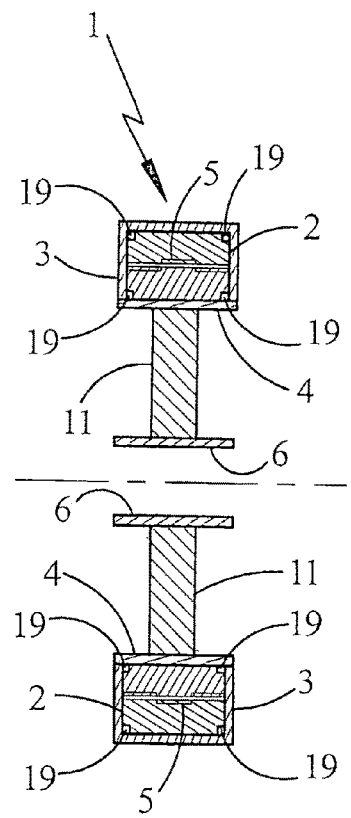
CLOSED VALVE POSITION
CLOSED VALVE POSITION
FIG.9A
FIG.9B

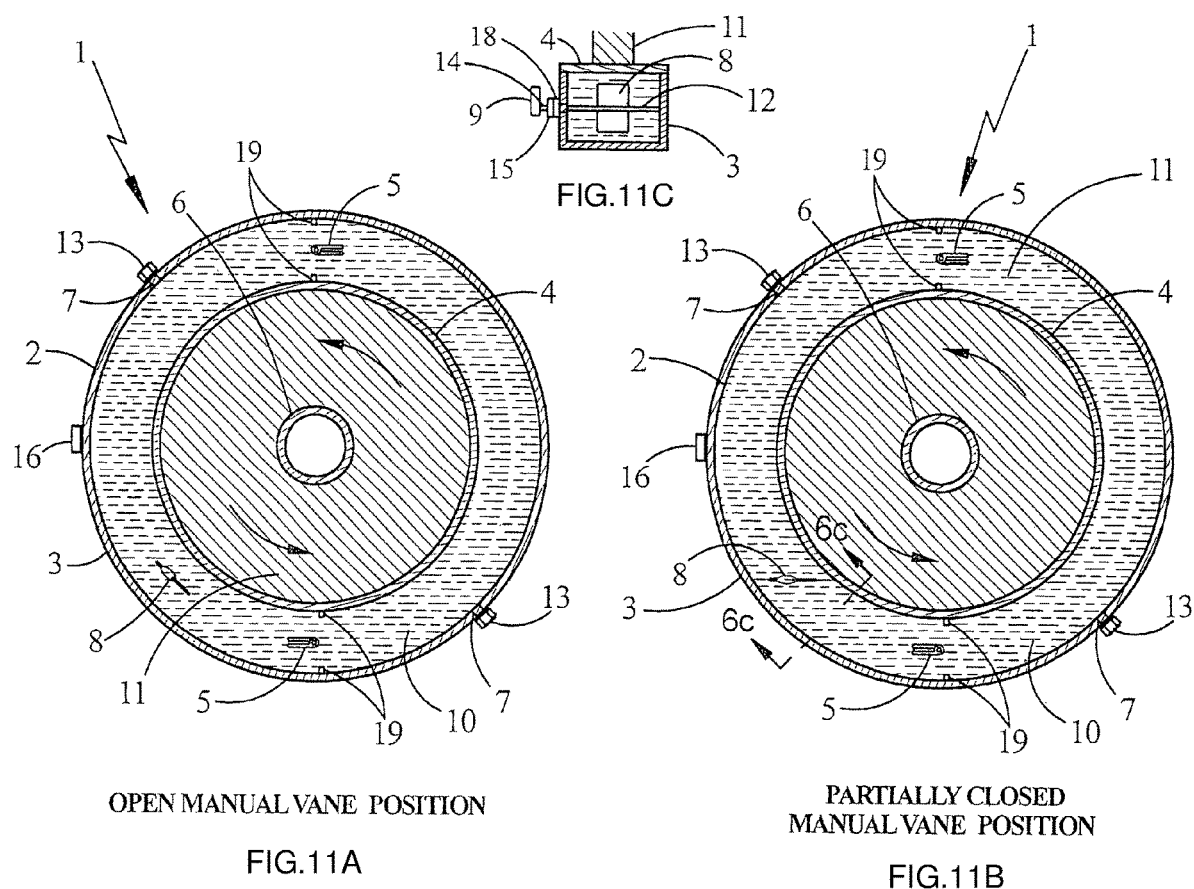

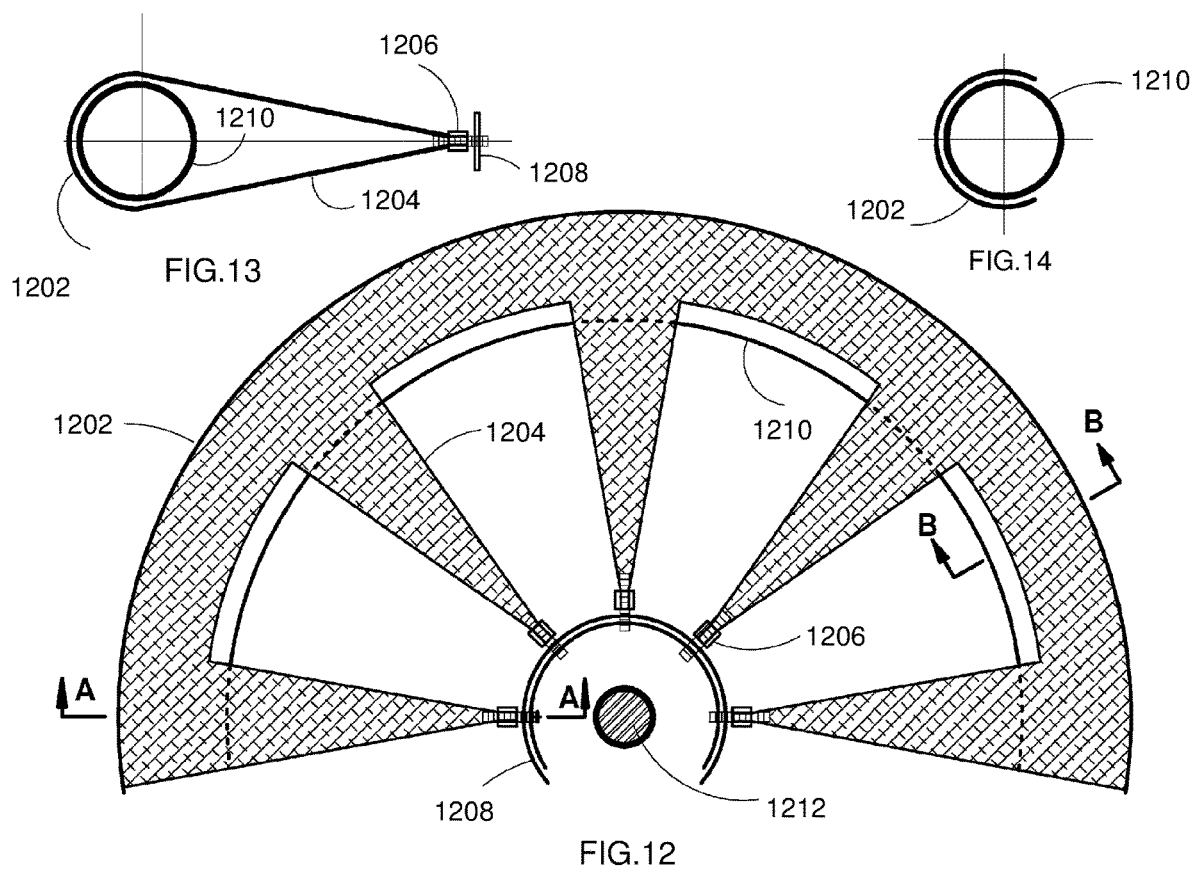

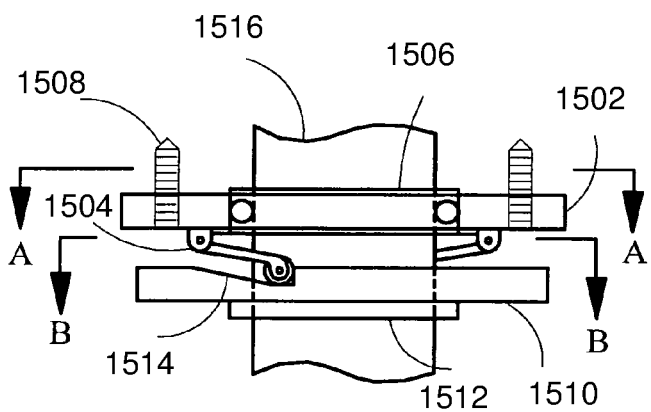
FIG.15
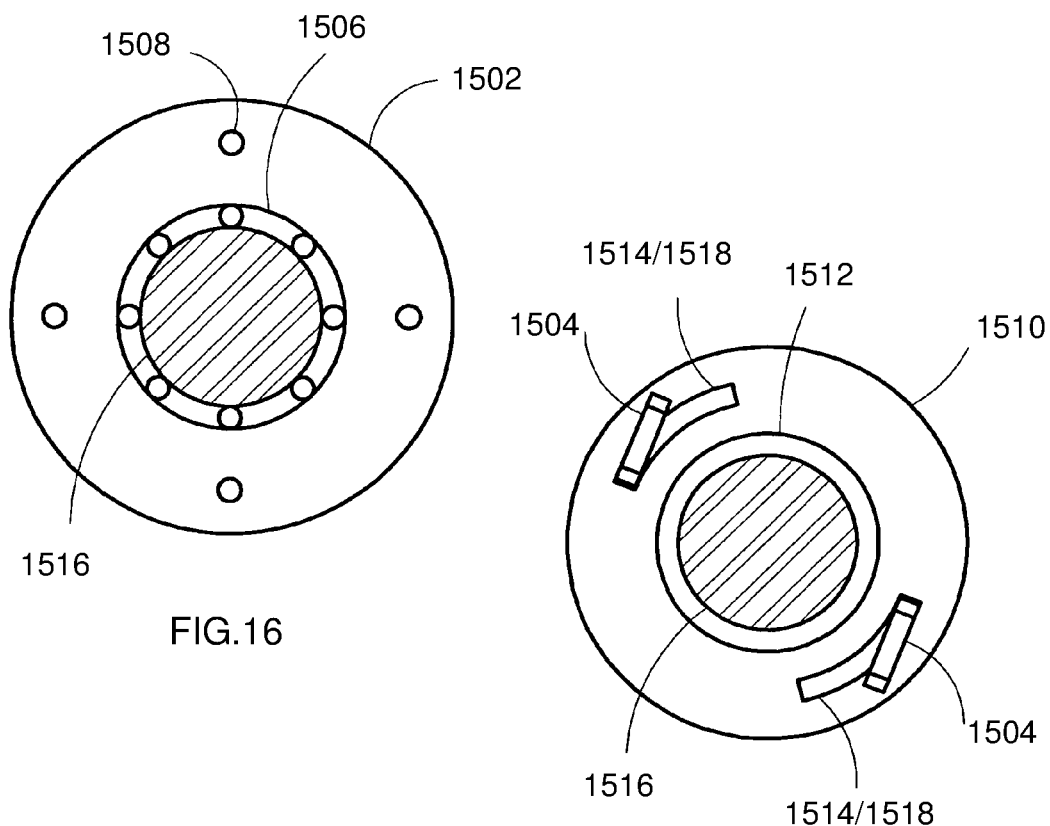
FIG.16
FIG.17

SUPPLEMENTAL REGENERATIVE BRAKING SYSTEM

TECHNICAL FIELD

Some implementations relate to regenerative braking systems, and, in particular, to supplemental regenerative braking systems having a flywheel energy storage device to store mechanical energy and generate electrical energy from stored mechanical energy.

BACKGROUND

Some vehicles, such as all-electric and hybrid vehicles, may suffer from one or more limitations in various performance parameters such as available driving range, battery storage capacity, battery charge rate, battery flammability, vehicle stability, braking performance, etc.

The disclosed subject matter was conceived in light of the above limitations, among other things.

SUMMARY

Some implementations can include a system comprising a power take-off section to receive mechanical energy, and an electric clutch to engage the power take-off section and transfer mechanical energy from the power take-off section to an output of the electric clutch. The system can also include a roller stop assembly coupled to the output of the electric clutch and constructed to transfer mechanical energy from the output of the electric clutch, and a generator coupled to the roller stop assembly. The system can further include a flywheel coupled to the generator.

The flywheel can include a variable inertia flywheel. The variable inertia flywheel can contain a liquid. The liquid can include a fire suppressant liquid. The variable inertia flywheel can include containment reinforcement members.

The variable inertia flywheel can include a top side and a bottom side. The bottom side can be disposed above a battery of the vehicle. The bottom side can be formed of a material having a melting point that permits the bottom of the variable inertia flywheel to melt and release the fire suppressant liquid over the battery when the battery is on fire or heated to a temperature that indicates battery fire may be imminent.

In some implementations, the electric clutch is engaged when a brake light of the vehicle has activated, and wherein the system assists with deceleration when the electric clutch is engaged and when a rotational speed of the roller stop assembly exceeds a rotational speed of the flywheel. The roller stop assembly transfers mechanical energy when a rotational speed of the roller stop assembly exceeds a rotational speed of the flywheel. The flywheel can be mounted so as to provide a gyroscopic force to help stabilize the vehicle when the flywheel is rotating.

Some implementations can include a system comprising a power take-off section to receive mechanical energy from a vehicle, and an electric clutch to engage the power take-off section and transfer mechanical energy from the power take-off section to an output of the electric clutch and to assist with vehicle deceleration when the electric clutch is engaged. The system can also include a roller stop assembly coupled to the output of the electric clutch and constructed to transfer mechanical energy from the output of the electric clutch, and a motor/generator coupled to the roller stop assembly. The system can further include a variable inertia flywheel coupled to the motor/generator so as to receive mechanical energy when the electric clutch is engaged and when a rotational speed of the roller stop assembly exceeds a rotational speed of the variable inertia flywheel, wherein the variable inertia flywheel is mounted so as to provide a gyroscopic force to help stabilize the vehicle when the variable inertia flywheel is rotating.

The variable inertia flywheel can contain a liquid. The liquid can include a fire suppressant liquid. The variable inertia flywheel can include a top side and a bottom side. The bottom side can be disposed above a battery of the vehicle. The bottom side can be formed of a material having a melting point that permits the bottom of the variable inertia flywheel to melt and release the fire suppressant liquid over the battery when the battery is on fire or heated to a temperature that indicates battery fire may be imminent. The variable inertia flywheel can include containment reinforcement members.

Some implementations can include a charge rate improvement system for electric vehicles, the system comprising a motor/generator coupled to the flywheel, and a flywheel coupled to the motor/generator. The motor/generator can be configured to receive a portion of electrical charge current when the electric vehicle is connected to a charging station. The portion of electrical charge current can include that current that cannot be absorbed by a battery charging system within the electric vehicle. The portion of electrical charge current can be provided to the motor to cause the motor to rotate the flywheel to store the portion of electrical charge current as mechanical energy in the flywheel.

Some implementations can include a battery fire suppression system for an electric vehicle, the system comprising a variable inertia flywheel containing a fire suppressant liquid. The variable inertia flywheel can include a top side and a bottom side. The bottom side can be disposed above a battery of the electric vehicle. The bottom side can be formed of a material having a melting point that permits the bottom of the variable inertia flywheel to melt and release the fire suppressant liquid over the battery when the battery is on fire or heated to a temperature that indicates battery fire may be imminent.

Some implementations can include an operational range improvement system for electric vehicles, the system comprising a power take-off section to receive mechanical energy from the electric vehicle, and an electric clutch to engage the power take-off section and transfer mechanical energy from the power take-off section to an output of the electric clutch. The system can include a roller stop assembly coupled to the output of the electric clutch and constructed to transfer mechanical energy from the output of the electric clutch, and a generator coupled to the roller stop assembly. The system can further include a flywheel coupled to the generator so as to receive mechanical energy from the roller stop assembly via the generator. The flywheel can be operable to provide stored mechanical energy to the generator, which in turn produces electricity from the stored mechanical energy, the electricity being provided to the electric vehicle to extend the operational range of the electric vehicle beyond that provided by a battery of the electric vehicle.

BRIEF DESCRIPTION OF THE DRAWINGS

FIGS. 6A and 7A show lateral views of an example variable inertia flywheel with one type of a one-way restriction valve in accordance with some implementations.

FIGS. 6B and 7B are cross-sectional views of the flywheel showing the embodiments of FIGS. 6A and 7A, respectively.

FIGS. 8A and 9A show lateral views of an example variable inertia flywheel with another type of a one-way restriction valve in accordance with some implementations.

FIGS. 8B and 9B are cross-sectional views of the flywheel showing the embodiments of FIGS. 8A and 9A, respectively.

FIG. 11A shows a lateral view of an example variable inertia flywheel with adjustable vanes in the open position in accordance with some implementations.

FIG. 11B is a lateral view of the flywheel with adjustable vanes in a partially closed position.

FIG. 11C is an exploded view of FIG. 6B at line 6c to 6c of the adjustable vane in a partially closed position.

FIG. 12 shows a partial lateral view of the flywheel rotor inside the containment portion.

FIG. 13 shows a sectional view of the rotor inside the containment portion at a location through the strap along a line A-A in FIG. 12.

FIG. 14 shows a sectional view of the rotor inside the containment portion at a location between straps along a line B-B in FIG. 12.

FIG. 15 is a lateral view of an example positive locking roller stop device in accordance with some implementations.

FIG. 16 and FIG. 17 are cross-sectional views of the positive locking roller stop device in accordance with some implementations.

DETAILED DESCRIPTION

In general, a vehicle energy storage system that includes a flywheel (e.g., a variable inertia flywheel energy storage system) is disclosed. The vehicle energy storage system can also include regenerative braking features to obtain mechanical (or kinetic) energy from one or more wheels or axles of a vehicle and provide the mechanical energy to a flywheel energy storage system (e.g., a variable inertia flywheel as described herein). The energy stored in the flywheel can then be used to generate electrical energy via a motor/generator to operate one or more electrical motors (or other electrical devices) or charge a battery system of the vehicle.

The vehicle energy storage system can also improve the range of an electric vehicle, improve the charge rate of an electric vehicle, provide stability enhancement, and provide fire suppression.

Figure 1:
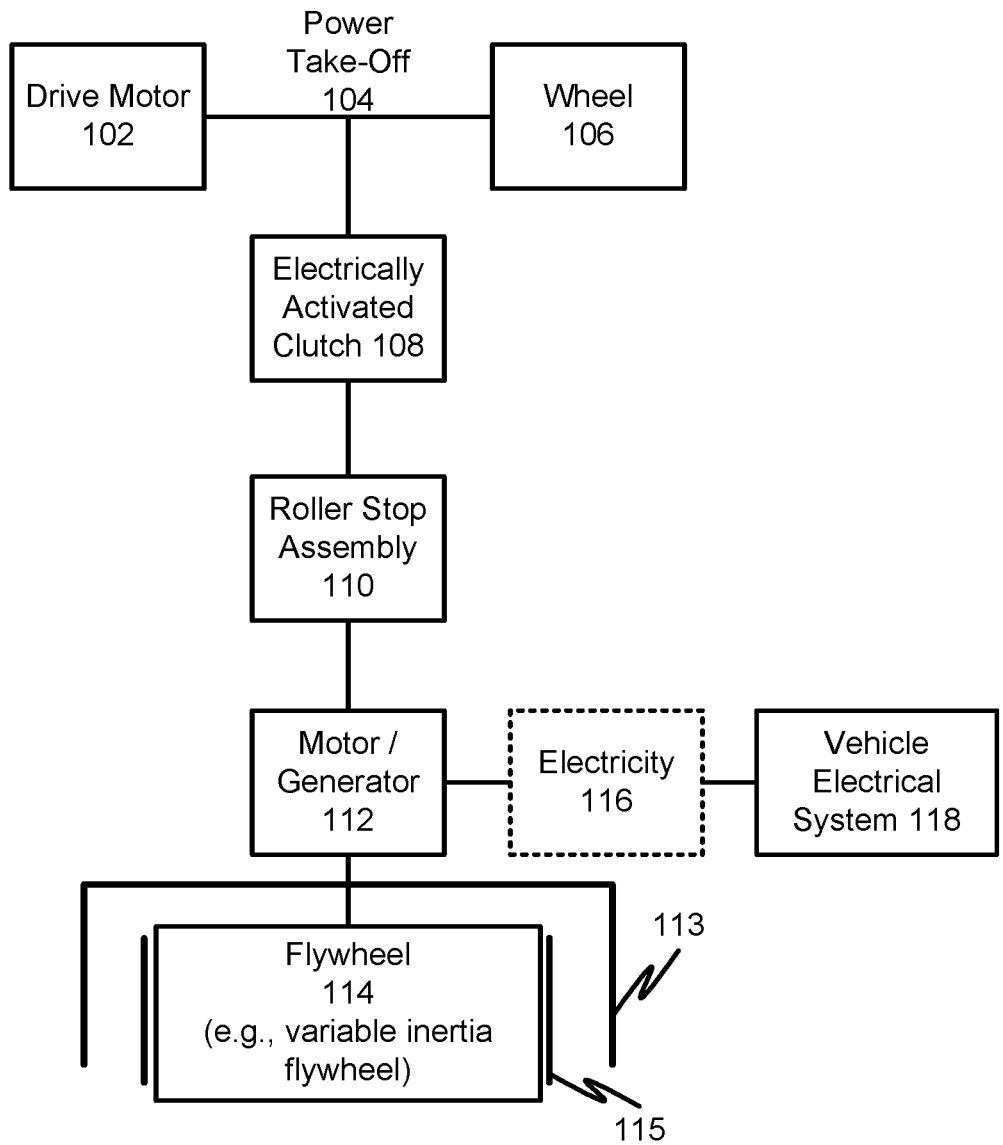
FIG. 1 is a diagram of an example vehicle energy storage system in accordance with some implementations.

FIG. 1 is a diagram of an example vehicle energy storage system 100 in accordance with some implementations. The system 100 includes a vehicle drive motor 102 (or plural motors), a power take-off member 104 (e.g., mechanical interface between drive train and energy system), a vehicle wheel 106 (or plural wheels), an electrically activated clutch 108, a roller stop assembly 110, a motor/generator 112 (or generator only), a flexible containment curtain 113 (e.g. made of an aramid fiber material, a para-aramid fiber material, or similar material), a flywheel 114 (e.g., a variable inertia flywheel) having a containment reinforcement system 115. The motor/generator 112 is configured to generate electricity 116 to provide to a vehicle electrical system 118.

The roller stop assembly 110 can include a roller stop similar to that described below (and in U.S. Pat. No. 8,413,781 issued to the same inventor as the present application and which is incorporated herein by reference in its entirety). The flywheel 114 can include a variable inertia flywheel similar to that described below (and in U.S. Pub. No. US 2011/0277587 A1, which is incorporated herein by reference in its entirety). The containment reinforcement system 115 can include a containment reinforcement system similar to that described below (and in U.S. Pat. No. 8,707,821 by the same inventor as the present application, and which is incorporated herein by reference in its entirety).

Figure 2:
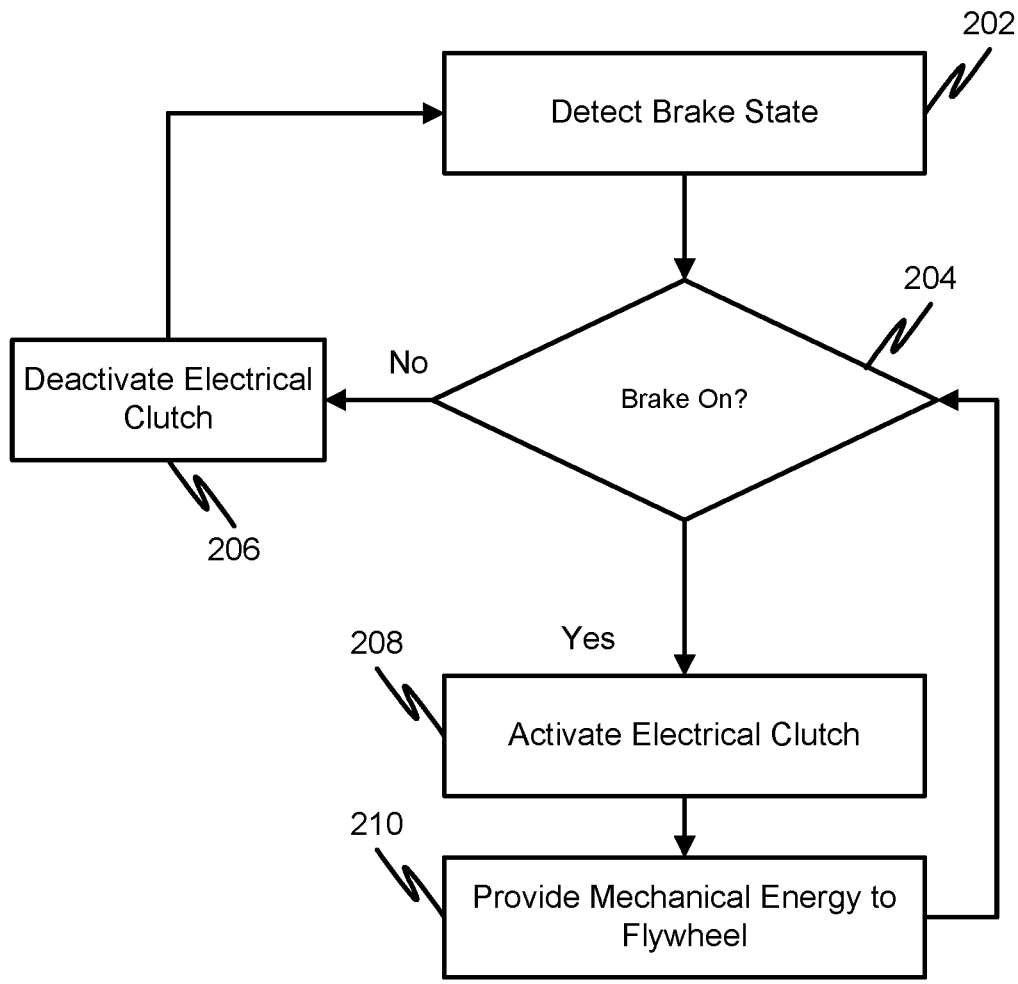
FIG. 2 is a flowchart of an example method for mechanical energy storage in a vehicle in accordance with some implementations.

FIG. 2 is a flowchart of an example method 200 for mechanical energy storage in a vehicle in accordance with some implementations. The method begins at 202 where brake state is detected. Brake state detection can include detecting brake light activation, detecting brake pedal activation, and detecting a brake signal from an automatic vehicle control system. Processing continues 204.

At 204, if the brake state indicates braking activated, control continues to 208. Otherwise, processing continues to 206.

At 206, the electrically activated clutch is deactivated and processing continues to 202.

At 208, the electrically activated clutch is activated and processing continues to 210.

At 210, mechanically energy is provided to the flywheel.

Figure 3:
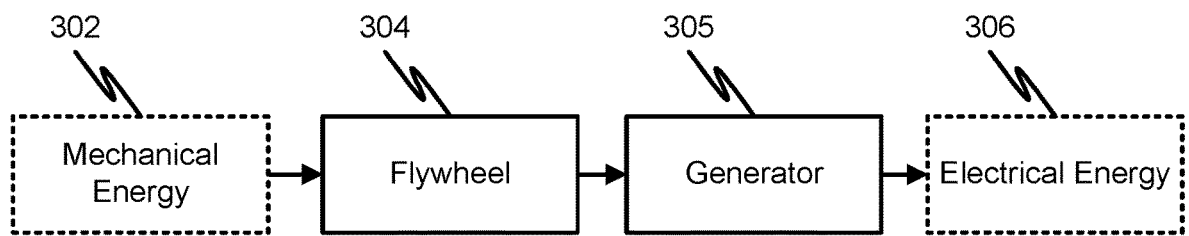
FIG. 3 is a diagram of a mechanical energy storage system in a vehicle in accordance with some implementations.

FIG. 3 is a diagram of a mechanical energy storage system 300 in a vehicle in accordance with some implementations. Mechanical energy 302 is provided to a flywheel 304 and then converted to electrical energy 306 via a generator 305.

Figure 4:
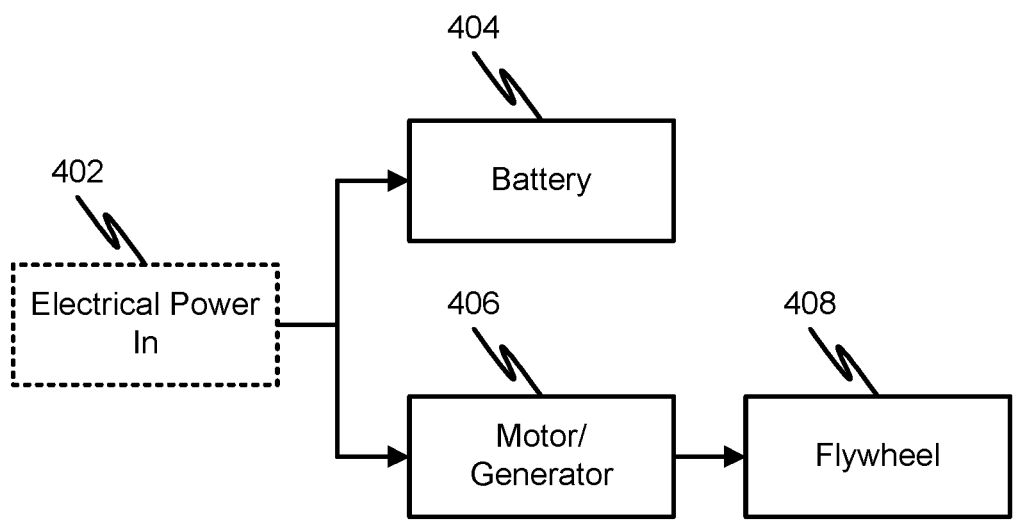
FIG. 4 is a diagram of an example electric vehicle charging system in accordance with some implementations.

FIG. 4 is a diagram of an example electric vehicle charging system 400 in accordance with some implementations. Electrical power comes in (at 402) and is provided to a battery 404 (via a battery charge system or the like). Any electrical energy that cannot be stored in the battery (e.g., current that is in excess of the battery charge rate) can be stored in a flywheel 408 via a motor/generator 406.

Figure 5:
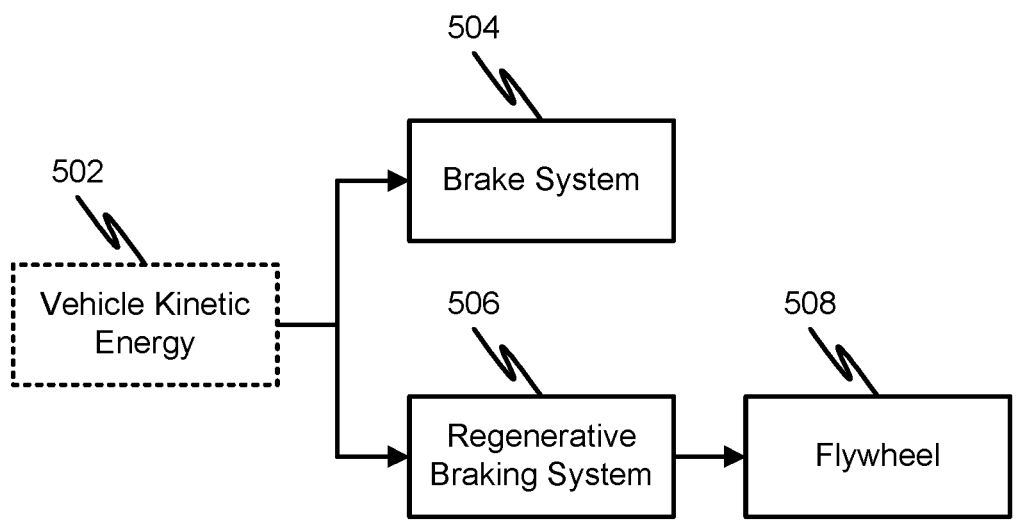
FIG. 5 is a diagram of an example regenerative braking system for a vehicle in accordance with some implementations.

FIG. 5 is a diagram of an example regenerative braking system 500 for a vehicle in accordance with some implementations. Kinetic energy from a vehicle (502) is absorbed during deceleration by a brake system 504 and a regenerative brake system 506 (which can include a system such as 100) to store some of the kinetic energy during braking or deceleration into a flywheel 508.

As shown in the Figures, the flywheel 1 of the present invention is a very simple device with few moving parts. One embodiment of the flywheel 1 is illustrated in FIGS. 6A and 6B. Beginning in the center of the flywheel 1 is a central mounting hub 6 ready to accept a rotational power source (not shown). The central mounting hub 6 is attached to the flywheel body 11, and the flywheel body 11 can be a solid disc (as shown) or spokes and constructed of any known materials suitable for the application in which it is used. A liquid chamber 2 is disposed around the periphery of the flywheel body 11 and may be of any convenient shape that will allow the liquid to flow freely. For example, the circular shape shown in FIG. 6A has a rectangular cross section, but could be a toroidal or doughnut shape having a circular cross section (not shown in the drawings). The liquid chamber 2 comprises an inner wall 4 and an outer wall 3. Attached on the inside surface of the outer wall 3 within the liquid chamber 2 is at least one one-way restriction valve 5. The one-way restriction valve 5 is attached to the inside surface of an outer wall 3 at a point of greatest radius from the center of the flywheel 1. Valve Seat 19 is attached to inner wall 4 at shortest distance from outer wall 3 to provide a seal for restriction valve 5 in closed position. A liquid 10 completely fills the inside of the liquid chamber 2. The outer wall 3 of the liquid chamber 2 includes at least one filling hole 7 to introduce the liquid 10 into the liquid chamber 2. The filling hole 7 is sealed by a closure such as a plug 13. Attached to the outside surface of the outer wall 3 is at least one counter balance weight 16.

Figure 10:
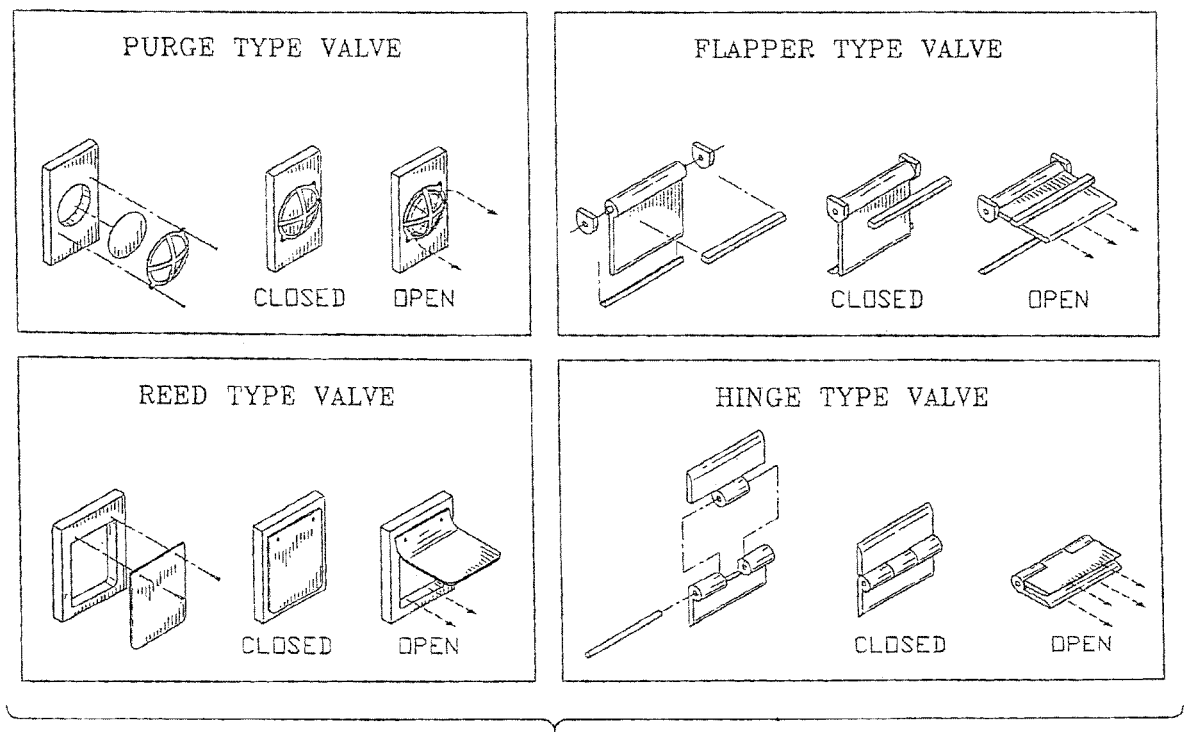
FIG. 10 illustrates four types of one-way restriction valves suitable for use in a variable inertia flywheel as disclosed herein.

In this embodiment, FIGS. 6A and 6B illustrate the one-way restriction valve 5 in an open valve position. FIGS. 7A and 7B illustrate the same embodiment as previously described shown in the closed position. Another embodiment of the flywheel 1 is illustrated in FIGS. 8A and 8B. All previously described parts illustrated in FIGS. 6A and 6B are the same in this embodiment except for illustrating a different type of one-way restriction valve 5. In this embodiment the one-way restriction valve 5 is attached to the inside walls of the outer wall 3 so that the one-way restriction valve 5 is placed in the center of the liquid chamber 2, and is illustrated in an open valve position. FIGS. 9A and 9B are the same embodiment as FIGS. 8A and 8B except that the one-way restriction valve 5 illustrates closed valve position against valve seat 19. FIG. 10 illustrates types of one-way restriction valves 5 suitable for use with the flywheel 1, illustrated in each of the other figures.

The one-way restriction valve 5 may be of any known configuration. The one-way restriction valve 5 may, be constructed of any material suitable for the type of valve being used and the application in which the flywheel will be used. For example, a flapper or hinge valve would be constructed of an inflexible material having sufficient strength to resist the combined mass of the contained liquid 10. For example, metals, hard plastics, carbon fiber, various composites, or other materials may be used so long as such materials are both inflexible and resistant to the liquid 10 used to fill the liquid chamber 2. FIG. 10 show purge or reed valves which would be constructed of a soft plastic or elastomeric material such as ABS (acrylonitrile butadiene styrene), PVC (polyvinyl chloride), CPVC (chlorinated polyvinyl chloride), PE (polyethylene), PVDF (polyvinylidene floride), or other materials so long as such materials are both flexible and resistant to the liquid 10 used to fill the liquid chamber 2. Other types of one-way restriction valves 5 also may be used.

During acceleration and rotation, as shown in FIGS. 6A-9B, which is in a counter clockwise direction, the flywheel 1 initially rotates at a greater speed than the liquid 10 and the movement of the one-way restriction valve 5 through the liquid 10 forces the one-way restriction valve 5 open. At a steady rotational speed of the flywheel 1, the liquid 10 and the flywheel 1, rotate at the same speed and the one-way restriction valve 5 stays open. When the flywheel 1 decelerates, for example when additional load is applied to the flywheel body 11, the movement of the liquid 10 against the one-way restriction valves 5 causes the one-way restriction valves 5 to close against valve seat 19 so that the liquid 10 is trapped, and now rotates at the same rotational speed as the flywheel body 11, thus combining the kinetic energy stored in the liquid 10 with that of the flywheel 1 to meet the additional load demands and maintain the speed of the inertia flywheel 1. The greater the ratio of the weight of liquid to the weight of solid in the inertia flywheel 1 the greater the efficiency of the flywheel.

Optionally one of more manually adjustable vanes 8 also may be attached by a central pin 12 to the front and rear surfaces of the liquid chamber 2 of the flywheel body 11, as shown in FIGS. 11A and 11B. Each manually adjustable vane 8 includes a mechanism for adjusting the angle of the adjustable vane 8 within the liquid chamber 2. This mechanism is accessible from the exterior of the flywheel body 11 as shown in FIG. 11C and comprises a stem 14 and stem seal 18 that is exterior to the flywheel body 11 and has a knurled knob, paddle shaped blade, or other handle 9 for adjusting the angle of the manually adjustable vane 8 within the liquid chamber 2. This mechanism also comprises a lock 15 to lock the manually adjustable vane 8 at the desired angle within the liquid chamber 2. The manually adjustable vanes 8 protrude into the liquid chamber 2 at an adjustable angle and push against the liquid 10 at the same speed of rotation as the flywheel body 11. Thus, these manually adjustable vanes 8 assist the liquid 10 to accelerate more rapidly to the rotational speed of the flywheel 1. More rapid acceleration of the liquid 10 is useful in situations where the flywheel 1 and the liquid 10 need to reach the same rotational speed more rapidly, for example, when it is known that the load on the flywheel will increase soon after the flywheel begins to rotate.

Optionally, the flywheel 1 of the present invention may contain multiple independent liquid chambers (not shown in drawings). If each of the multiple independent liquid chambers holds less liquid than one single chamber, but the total weight of the liquid 10 in both cases is the same, the total liquid 10 in the multiple independent chamber flywheel will accelerate to the rotational velocity of the flywheel faster than the liquid 10 in the single chamber, because the liquid 10 in the multiple independent chambers is exposed to a greater surface area, and therefore to greater frictional effects than the liquid 10 in just one chamber. Each of the multiple independent chambers may be filled with the same liquid or with different liquids.

The flywheel 1 of the present invention having a liquid chamber 2 and one-way restriction valves 5 and valve seat 19 requires less energy to attain its desired steady rotational speed than a traditional solid flywheel, because the liquid 10 in the liquid chamber 2 slides over the surrounding surfaces as the flywheel body 11 begins to rotate requiring significantly less energy for the flywheel body 11 to attain optimum speed. Near or at optimum speed the liquid 10 is rotating at the same speed as the flywheel body 11 due to the action of friction and centrifugal forces upon the liquid 10. The flywheel 1 of the present invention that also has manually adjustable vanes 8 will require a minimal increase in start-up energy than a flywheel without the manually adjustable vanes 8, but will accelerate to the rotational speed of the flywheel 1 more rapidly. Existing traditional flywheels may be retrofitted with an external peripheral liquid chamber 2 and one-way valves 5 and valve seat 19 which will significantly increase the stored kinetic energy of the flywheel while requiring only a minimal increase in start-up energy.

The variable inertia flywheel of the present invention is suitable for use in all applications in which flywheels in general are used, for example, with internal combustion engines, continuously variable transmissions, and electrical power generation equipment among others.

Parts are depicted and numbered as follows in one or more of the figures:

1 flywheel;
2 liquid chamber;
3 outer wall;
4 inner wall;
5 one-way restriction valve;
6 central mounting hub;
7 filling hole;
8 manually adjustable vane;
9 handle;
10 liquid;
11 flywheel body;
12 central pin;
13 plug;
14 stem;
15 lock;
16 counter balance weight;
17 intentionally omitted;
18 stem seal;
19 valve seal;

In FIGS. 12-14, the containment portion of the present disclosure comprises an outer harness 1202 that wraps around and supports the entire circumference of a flywheel rotor 1210. At desired intervals, evenly spaced straps 1204 taper from both sides of the outer harness 1202 to adjustable tensioners 1206 attached to the hub 1208. The hub 1208 is attached to an axle 1212 or can rotate freely on a bearing around the axle 1212. The adjustable tensioners 1206 function in a manner similar to that of the spokes of a bicycle wheel, and can be torqued to draw the outer harness 1202 tightly to the hub 1208 thus containing the flywheel rotor 1210. Optionally, the orientation of the tensioners 1206 can be such that each strap 1204 on each side of the flywheel rotor 1210 has a separate tensioner 1206 attached to the hub 1208.

The straps 1204 and harness 1202 which comprise the containment portion of the present invention may be constructed of light weight materials such as sheet metal, stainless steel, titanium, polymeric materials, or other materials having the strength to contain a rotor which is spinning at the rotational speed required by the intended use of the flywheel while not adding unnecessary weight to the combination. The harness 1202 surrounds the front edge and sides of the rotor 1210. The straps 1204 connect the harness 1202 to the adjustable tensioners 1206 that are positioned at intervals around hub 1208.

The flywheel of the present invention comprises a rotor 1210 which may be either solid or hollow, and which is drawn to the hub by the tensioning straps of the containment portion of the device. In a preferred embodiment, the flywheel rotor 1210 is a hollow circular tube constructed of steel, titanium, or other metallic material; composite materials; rubber; or other materials suitable to withstand the loads and stresses of the intended use of the flywheel, but light enough to not add unnecessary weight to the combination. The interior of the flywheel rotor 1210 can be filled with a non-corrosive liquid such as water (e.g., including a variable inertia flywheel as described herein). The "fill ratio", that is the ratio of the fluid mass to the structural mass, determines the performance of the flywheel.

For example, a flywheel with a fill ratio of 80% spins up five times faster and stores energy 25 times faster than a conventional flywheel of the same weight and diameter. Thus the high fill ratios obtainable with the containment flywheel of the present invention result in faster spin up times and faster energy storage. Flywheel rotor 1210 is mounted on axle 1212 at outer hub 1208. For example, at an 80% fill ratio a flywheel in accordance with some implementations can absorb 5 times more energy than a conventional solid flywheel of the same weight and diameter.

FIG. 15 shows a shaft 1516 through the center of disks 1502 and 1510 with the spring arm/rollers 1504, which are attached to disk 1502, operating on a plane perpendicular to the axis of the shaft 1516. Disk 1502 is attached to shaft 1516 through bearing 1506. Fasteners 1508 are used for attaching the positive locking roller stop device of the present disclosure to a work piece, such as a flywheel.

FIGS. 16 and 17 show disk 1502 mounted on a bearing 1506 allowing rotation independent of the shaft 81516, and disk 1510 mounted on the shaft 1516 and held in a fixed position by collar 1512. FIG. 15 and FIG. 17 also show the inclined notches 1514 or inclined ramps 1518 which are inscribed into or raised above the surface of disk 1510, and engage the spring arm/rollers 1504 attached to disk 1502.

Figure 18A:
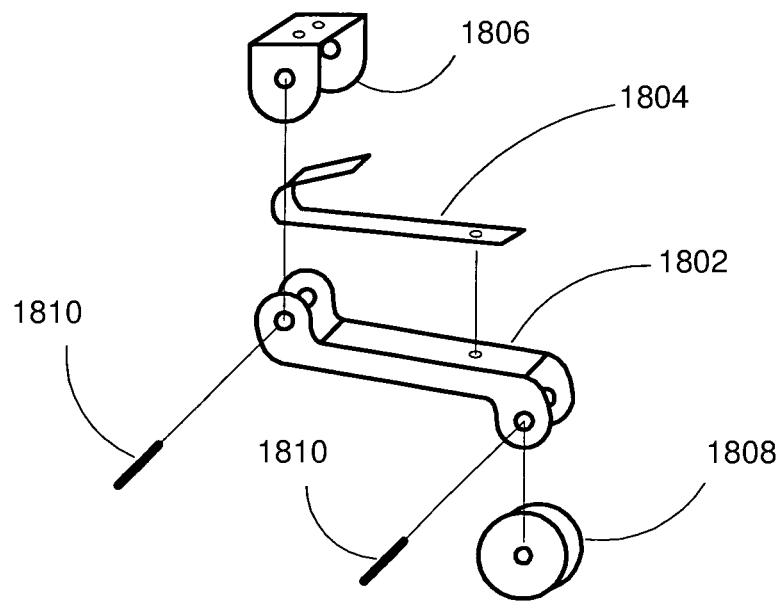
FIGS. 18A-18C show detail of the spring arm/roller in accordance with some implementations.
Figure 18B:
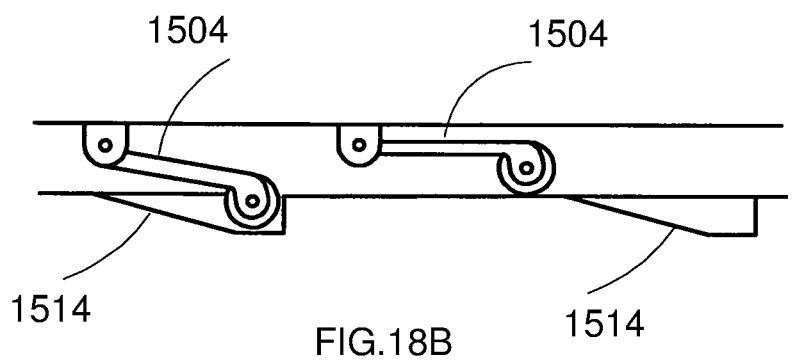
Figure 18C:
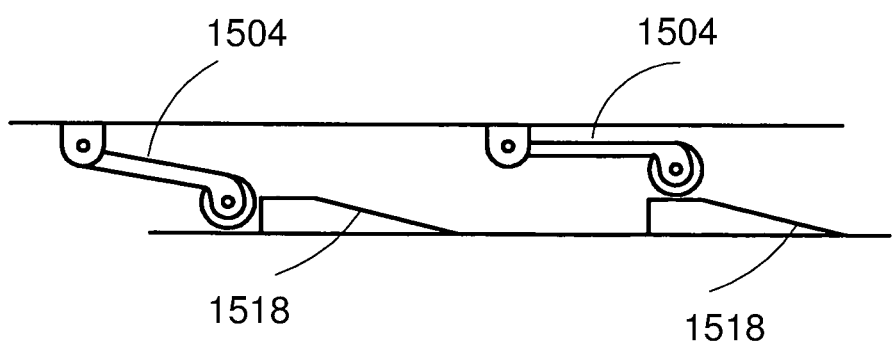

FIG. 18A is a detail of the spring arm/roller 1504 showing the spring arm 1802, spring 1804, bracket 1806 for attaching the spring arm 1802 to the surface of disk 1502, roller 1808, and pins 1810 for attaching the roller 1808 to the roller arm 1802 and attaching roller arm 1802 to bracket 1806 attached to disk 1502. FIG. 18B is a lateral view of the two positions of the spring arm/roller 1504 with respect to the surfaces of disk 1502, disk 1510 and inclined notch 1514 cut in disk 1510. FIG. 18C is a lateral view of the two positions of the spring arm/roller 1504 with respect to the surfaces of disk 1502, disk 1510, and inclined ramp 1518 positioned above the surface of disk 51510, as an alternative to the inclined notch 1514 shown in FIG. 18B.

As shown in the figures, the positive locking roller stop device of the present disclosure is a very simple device with few moving parts.

The positive locking roller stop device configuration shown in FIGS. 15-17 can include disk 1502 and disk 1510 of any convenient size and thickness aligned on a shaft 1516 with the sufficient space between the two disks to allow the spring arm/rollers 1504 room for proper travel. As shown in FIG. 15, disk 1510, which includes the inclined notches 1514 or inclined ramps 1518, is attached to shaft 1516 in a fixed position by collar 1512, so that shaft 1516 and disk 1510 rotate together. Disk 1502, to which the spring arm/rollers 1504 are attached, is attached to bearing 1506 and rotates independently of shaft 1516 and disk 1510, if rotation of disk 1502 is faster than shaft 1516 and disk 1510. The orientation of the disks 1502 and 1510 as being attached to shaft 1516 in a fixed position or rotating freely on a bearing may be reversed. Fasteners 1508 in disk 1502 provide a means of attaching a work piece such as a flywheel.

The size, configuration and number of spring arm/rollers 1504 used can vary. The orientation of the spring arm rollers 1504 on disk 1502 and the inclined notches 1514 or inclined ramps 1518 on disk 1510 to the axis of shaft 1516 also may vary from a plane perpendicular to the axis of shaft 1516 as shown in FIG. 15 to a plane parallel to the axis of shaft 1516. The spring arm/roller 1505 is comprised of the arm 1802, spring 1804, bracket 1806, roller 1808 and pins 1810 as shown in FIG. 18A.

When the rotational speed of shaft 1516 and disk 1510 is equal to that of disk 1502, the inclined notches 1514 cut in disk 1510 or inclined ramps 1518 positioned above the surface of disk 1510, engage with the spring arm/rollers 1504 attached to disk 1502, and the rotational speed of disk 1502 remains the same as shaft 1516 and disk 1510. When the rotational speed of shaft 1516 and disk 1510 decreases, the spring arm/rollers 1504 attached to disk 11502 roll freely over disk 1510 unaffected by the slowing of shaft 1516 and disk 1510.

It is, therefore, apparent that there is provided in accordance with the presently disclosed subject matter, a supplemental regenerative braking system having a flywheel energy storage device to store mechanical energy and generate electrical energy from stored mechanical energy. While this disclosed subject matter has been described in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of the disclosed subject matter.

What is claimed is:

1. A system comprising:
a power take-off section to receive mechanical energy from a vehicle;
an electric clutch to engage the power take-off section and transfer mechanical energy from the power take-off section to an output of the electric clutch and to assist with vehicle deceleration when the electric clutch is engaged;
a roller stop assembly coupled to the output of the electric clutch and constructed to transfer mechanical energy from the output of the electric clutch;
a motor/generator coupled to the roller stop assembly; and
a variable rotational resistance fixed moment of inertia flywheel coupled to the motor/generator so as to receive mechanical energy when the electric clutch is engaged and when a rotational speed of the roller stop assembly exceeds a rotational speed of the variable rotational resistance fixed moment of inertia flywheel, wherein the variable rotational resistance fixed moment of inertia flywheel is mounted so as to provide a gyroscopic force to help stabilize the vehicle when the variable rotational resistance fixed moment of inertia flywheel is rotating, and wherein the variable rotational resistance fixed moment of inertia flywheel contains a liquid, and wherein the liquid is a fire suppressant liquid, and wherein the variable rotational resistance fixed moment of inertia flywheel includes a top side and a bottom side, and wherein the bottom side is disposed above a battery of the vehicle, and wherein the bottom side is formed of a material having a melting point that permits the bottom of the variable rotational resistance fixed moment of inertia flywheel to melt and release the fire suppressant liquid over the battery when the battery is on fire or heated to a temperature that indicates battery fire may be imminent.

2. The system of claim 1, wherein the variable inertia flywheel includes containment reinforcement members.

3. A system comprising:
a power take-off section to receive mechanical energy from a vehicle;
an electric clutch to engage the power take-off section and transfer mechanical energy from the power take-off section to an output of the electric clutch and to assist with vehicle deceleration when the electric clutch is engaged;
a roller stop assembly coupled to the output of the electric clutch and constructed to transfer mechanical energy from the output of the electric clutch;
a motor/generator coupled to the roller stop assembly; and
a variable rotational resistance fixed moment of inertia flywheel coupled to the motor/generator so as to receive mechanical energy when the electric clutch is engaged and when a rotational speed of the roller stop assembly exceeds a rotational speed of the variable rotational resistance fixed moment of inertia flywheel, wherein the variable rotational resistance fixed moment of inertia flywheel is mounted so as to provide a gyroscopic force to help stabilize the vehicle when the variable rotational resistance fixed moment of inertia flywheel is rotating, wherein the variable rotational resistance fixed moment of inertia flywheel contains a liquid,
wherein the electric clutch is engaged when a brake light of a vehicle has activated, and wherein the system assists with deceleration when the electric clutch is engaged and when the rotational speed of the roller stop assembly exceeds the rotational speed of the variable rotational resistance fixed moment of inertia flywheel.

4. A system comprising:
a power take-off section to receive mechanical energy from a vehicle;
an electric clutch to engage the power take-off section and transfer mechanical energy from the power take-off section to an output of the electric clutch and to assist with vehicle deceleration when the electric clutch is engaged;
a roller stop assembly coupled to the output of the electric clutch and constructed to transfer mechanical energy from the output of the electric clutch;
a motor/generator coupled to the roller stop assembly; and
a variable rotational resistance fixed moment of inertia flywheel coupled to the motor/generator so as to receive mechanical energy when the electric clutch is engaged and when a rotational speed of the roller stop assembly exceeds a rotational speed of the variable rotational resistance fixed moment of inertia flywheel, wherein the variable rotational resistance fixed moment of inertia flywheel is mounted so as to provide a gyroscopic force to help stabilize the vehicle when the variable rotational resistance fixed moment of inertia flywheel is rotating, and wherein the variable rotational resistance fixed moment of inertia flywheel contains a liquid,
wherein the roller stop assembly transfers mechanical energy when the rotational speed of the roller stop assembly exceeds the rotational speed of the variable rotational resistance fixed moment of inertia flywheel.

* * * * *